United States Patent

Preinfalk et al.

[15] 3,703,943

[45] Nov. 28, 1972

[54] DEFORMABLE TRACK BRAKE

[72] Inventors: Franz Preinfalk, Langenfeld; Gunther Meuters, Moers-Asberg, both of Germany

[73] Assignee: August Thyssen-Hutte AG, Duisburg-Hambron, Germany

[22] Filed: Oct. 15, 1970

[21] Appl. No.: 80,858

[30] Foreign Application Priority Data

Dec. 24, 1969 Germany..........P 19 64 812.5

[52] U.S. Cl....................................188/62, 238/283
[51] Int. Cl. ................................................B61k 7/02
[58] Field of Search ...................188/32, 62; 238/283

[56] References Cited

UNITED STATES PATENTS 3,125,185 3/1964 Creedle et al. ..............188/62
3,439,778 4/1969 Garbers et al. ..............188/62

*Primary Examiner*—Duane A. Reger
*Attorney*—Burgess, Dinklage & Sprung

[57] ABSTRACT

Deformable rubber track brake having a rubber rail secured to a foundation one side of which has a curb which overreaches a flange at the base of the rubber rail. The other side of the foundation is provided with a holder for limiting the lateral movement of the rail.

6 Claims, 3 Drawing Figures

PATENTED NOV 28 1972 3,703,943
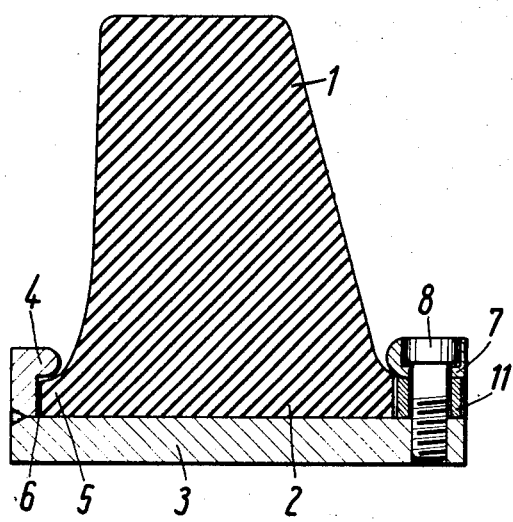
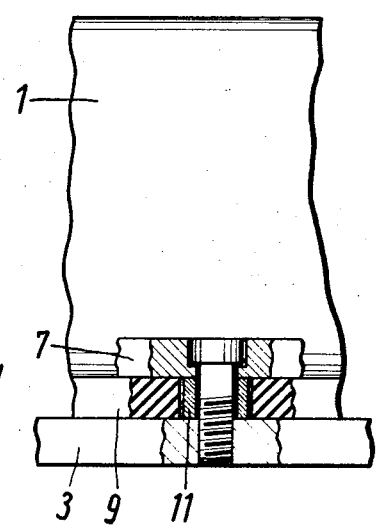
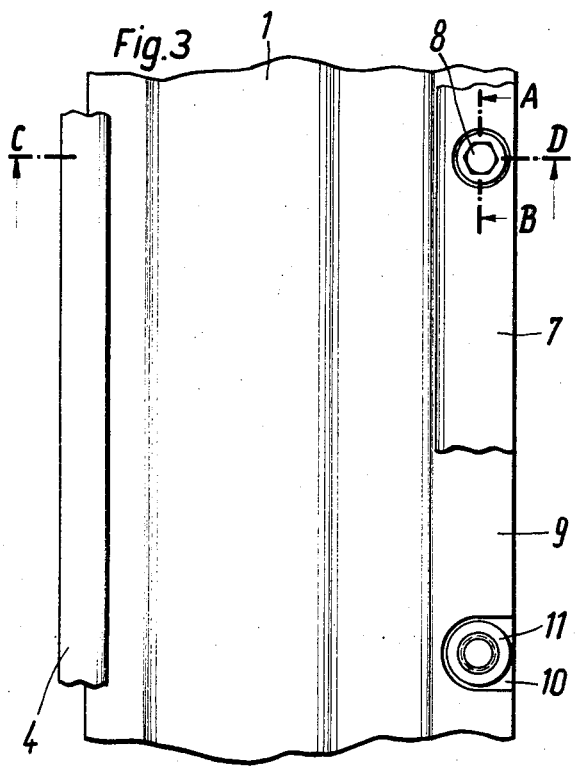
Inventors:
FRANZ PREINFALK
GÜNTHER MEUTERS
BY Burgess, Dinklage & Sprung 3,703,943

DEFORMABLE TRACK BRAKE

BACKGROUND

This invention relates to a rubber track brake whose rubber body extending longitudinally of the brake lies on a foundation.

Such rubber track brakes are known. In one known embodiment (German Auslegeschrift 1,290,946) the rubber body is vulcanized onto the foundation. The strong bonding of the rubber body to the foundation, which consists as a steel bar, entirely prevents or at least greatly restricts the transverse and longitudinal expansion of the lower portion of the rubber body. Because of this prevention or restriction of the deformation of this portion of the rubber body, this portion does not participate in the braking action. Thus braking action is exercised only by the upper portion of the rubber body. The braking action of a rubber body affixed by vulcanization to the foundation is less than that of rubber bodies of equal rubber volume whose transverse expansion is not restricted. The bonding of the rubber rail body to a foundation, however, also has the additional disadvantage that, in the area of the vulcanization, great shear stresses are produced due to the different elastic properties of rubber and steel. The shear stresses which cannot be absorbed by expansion in the rubber lead to the premature wearing out of the rubber body. If a rubber track brake worn out in this manner has to be replaced, the prior art design makes it necessary to remove the rubber body together with its foundation plate. The great weight of the steel foundation plate makes such removal difficult. If the steel foundation plate is to be reused, the old rubber material must be removed and the steel bar must be prepared for another vulcanization.

In another known rubber track brake (British Pat. No. 272,785) the rubber body is about half encased with its lower portion in a steel channel. In this design, too, the lower portion of the rubber profile does not participate in the deformation and therefore does not contribute to the braking action, either. Furthermore, this design is suitable for only rather short brake bodies because the indentations made by the wheels in rubber track brakes always produce tensions in the upper area of the brake body which tend to lift the rubber away from the foundation at both ends; in the case of relatively long brake actions this is intensified by the number of wheels acting on the same rubber body.

SUMMARY

An object of this invention is to provide a rubber track brake in which virtually the entire rubber volume can be deformed in the braking. The rubber track brake of this invention furthermore has a longer life than prior rubber track brakes and is easily replaceable. In addition, even when engaged by a plurality of wheels, the rubber bodies are held firmly to the foundation.

This object is achieved in the present invention by a rubber track brake the rubber rail of which extends longitudinally of the brake and rests on a foundation plate; curbing means are fastened to one longitudinal side of the foundation plate and overreach, with lateral clearance, a flange provided on the base of the rubber rail. On the other longitudinal side of the foundation plate a holding means are provided which limit the lateral movement of the rubber rail.

THE DRAWING

The invention is further explained hereinafter with the aid of an example of its embodiment.

FIG. 1 is a vertical cross-sectional view of a rubber rail secured to a foundation plate according to the present invention.

FIG. 2 is a cross sectional view taken along the line A–B of FIG. 3.

FIG. 3 is a top view, partially broken away, of the rail of FIG. 1.

DESCRIPTION

In the track brake of the invention the entire brake rail can be deformed in the braking. Thus, the braking effect in proportion to the total volume of the rubber rail is optimum in the brake of the invention. Since the rubber rail is not bonded to the foundation plate, no shear stresses are produced at the bottom surface or immediately above the bottom surface. In this manner the useful life of the rubber rail is extended in comparison to known rubber rails which are bonded to a foundation plate. Even though the rubber rail lies freely on the foundation plate, it is secured against lifting from the foundation plates by the curbing means overreaching flanges on the base of the rubber rail. The holding member prevents the rubber rail from slipping laterally from beneath the curbing means.

An even more secure holding of the rubber rail to the foundation plate is achieved, according to an embodiment of the invention, in that an additional curbing means is fastened to the other longitudinal side of the foundation plate to serve as a holding element, and overreaches a flange provided on the base of the rubber rail. According to this embodiment, therefore, the rubber rail is held on both sides by curbing means overreaching flanges on both sides of the rail.

According to a further embodiment of the invention, a rubber track brake of simple design is characterized in that the first curbing means forms a groove facing the center of the foundation plate and a flange on the base of the rubber rail seats in the groove.

In an easy-to-repair rubber track brake, the second curbing means, according to a further embodiment of the invention, is a strip which lies over a second flange on the base of the rubber rail and is bolted to the foundation plate by means of bolts and spaced therefrom by means of spacers. To replace the rubber rail in a rubber track brake in need of repair, the strip need only be removed by loosening the bolts; then the old rubber rail can be removed and the new one inserted. The spacers are provided so that the second flange at the base of the rubber rail is freely movable instead of being clamped in place.

According to a further embodiment, the brake of this invention can be secured against the shifting of the rubber rail on the foundation plate longitudinally (lengthwise) of the rubber track brake by providing the rubber rail with longitudinally spaced notches into which snubbing means having a matching shape affixed to the foundation plate engage. Preferably these notches are in the second flange of the rail through which the bolts pass, the bolts serving as the snubbing means affixed to the foundation plate.

Referring now to the drawing, a rubber track brake according to the invention possesses a rubber rail 1.

The rubber rail 1 has essentially a trapezoidal shape in cross-section, the shorter parallel side being on top. The base 2 of the rubber rail 1 lies on a foundation plate 3. The foundation plate 3 is a steel bar which has on one longitudinal edge a groove 4 facing the center of the foundation plate 3. The groove 4 is formed by an angle iron welded to the foundation plate 3. A flange 5 made in one piece with the rubber rail 1 and located at the base 2 of the rubber rail 1 engages or seats in the groove 4. The upper side of the groove 4 overreaches flange 5 and prevents the lifting of the rubber rail 1 from the foundation plate 3. To enable the rubber rail 1 to expand transversely when braking, a clearance 6 is left between the outer edge of the flange 5 and the side of the groove 4. For the same reason the inner edge of the upper side of the groove 4 does not tightly engage the sides of the rubber rail 1.

To prevent the flange 5 of rubber rail 1 from slipping out of the groove 4, a strip 7, which is removably fastened to the base plate 3 by means of bolts 8, is provided as a curbing means on the side of rubber rail 1 opposite the flange 5. This strip 7 lies over a second flange 9 of the rubber rail 1, which is provided on the side of rubber rail 1 opposite the first flange 5 and is made in one piece with the rubber rail 1. To prevent the rubber rail 1 from shifting longitudinally in braking, notches 10 (FIG. 3) are provided in the second flange, through which the bolts 8 extend with spacers 11 between the foundation plate 3 and the strip 7. The spacers 11 serve to maintain the distance between strip 7 and the foundation plate 3. The thickness of the spacers 3 is such that the spacing between strip 7 and foundation plate 3 is great enough to permit the second flange 9 to move transversely under strip 7.

In the rubber track brake according to the invention, the rubber rail 1 is able to expand transversely when loaded. Groove 4 and strip 7 do not hamper the transverse expansion. The rubber volume that is present therefore takes part wholly in the deformation, and an optimum utilization of the rubber volume for the braking is obtained. Although the rubber rail 1 is held on foundation plate 3 so that it cannot be displaced lengthwise, and although it is secured against lifting, the rubber body can easily be replaced. All one need do is remove strip 7 by unfastening the bolts. The rubber body can then be lifted out of groove 4. If in another embodiment an angle iron should be provided instead of the strip 7, the rubber rail can be slid into place from one end of the foundation plate with its flanges in the respective grooves.

The special advantages of the invention thus consist in an augmentation of the braking power for the same volume of rubber, in a lengthening of the useful life of the rail brake, in a simplification of assembly, and in a reduction of the cost of manufacture.

What is claimed is:

1. Rubber track brake comprising a rubber rail extending lengthwise of the brake and resting on a foundation plate, one side of said foundation plate having curbing means which overreach with lateral clearance a flange provided on the base of said rubber rail, the other side of said foundation plate being provided with holding means for limiting lateral movement of said rubber rail.

2. Rubber track brake of claim 1 wherein said holding means includes additional curbing means which overreach a second flange provided on the base of said rubber rail.

3. Rubber track brake of claim 1 wherein said curbing means is a groove facing the center of said foundation plate which engages said flange provided on the base of said rubber rail.

4. Rubber track brake of claim 2 wherein said additional curbing means is a strip which lies over said second flange and which is secured to said foundation plate.

5. Rubber track brake of claim 2 wherein said rubber rail has longitudinally spaced notches which engage matching snubbing means fastened to said foundation plate.

6. Rubber track brake of claim 5, wherein said notches are in said second flange through which bolts are passed which serve as the snubbing means.

* * * * *